(12) United States Patent
Al-Essa et al.

(10) Patent No.: US 11,979,408 B2
(45) Date of Patent: May 7, 2024

(54) SYSTEMS AND METHODS FOR CONTROLLING USER ACCESS TO COMPUTER RESOURCES OF AN ORGANIZATION BY SEPARATED EMPLOYEES

(71) Applicant: Saudi Arabian Oil Company, Dhahran (SA)

(72) Inventors: Abdullah Tariq Al-Essa, Dammam (SA); Khalid H. Qahtani, Dammam (SA); Norah A. Yousif, Dammam (SA); Waleed A. Alamri, Khobar (SA); Tariq S. Alshlash, Dhahran (SA); Lamia M. Mugla, Ras Tanura (SA); Fahd S. Alghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 359 days.

(21) Appl. No.: 17/526,835

(22) Filed: Nov. 15, 2021

(65) Prior Publication Data
US 2023/0156009 A1    May 18, 2023

(51) Int. Cl.
*H04L 9/40* (2022.01)
*G06Q 10/105* (2023.01)

(52) U.S. Cl.
CPC ......... *H04L 63/102* (2013.01); *G06Q 10/105* (2013.01)

(58) Field of Classification Search
CPC ..... H04L 63/102; H04L 63/20; G06Q 10/105; G06Q 10/107
See application file for complete search history.

(56) References Cited

U.S. PATENT DOCUMENTS

| 7,401,083 B2 | 7/2008 | Daemke et al. |
| 2015/0120591 A1* | 4/2015 | Yoakum ............... G06Q 10/105 705/320 |

(Continued)

OTHER PUBLICATIONS

Docs.microsoft.com [online], "Overview: Remove a former employee and secure data," Microsoft, available on or before Mar. 13, 3030, via Internet Archive Wayback Machine URL <https://web.archive.org/web/20200313050820/https://docs.microsoft.com/en-us/microsoft-365/admin/add-users/remove-former-employee?view=o365-worldwide>, retrieved Oct. 26, 2021, retrieved from URL <https://docs.microsoft.com/en-us/microsoft-365/admin/add-users/remove-former-employee?view=o365-worldwide>, 15 pages.

(Continued)

*Primary Examiner* — Amie C. Lin
(74) *Attorney, Agent, or Firm* — Fish & Richardson P.C.

(57) ABSTRACT

In an example method, a system obtains a data record indicating an anticipated change in an employment status of a user at an organization, including a data field indicating an effective time of the anticipated change. At a first time prior to the effective time, the system modifies an access privilege of the user with respect to computer resources of the organization, including (i) allowing the user to perform first operations using the computer resources between the first time and a second time subsequent to the first time, and (ii) preventing the user from performing second operations using the computer resources starting at the first time. At the second time, the system further modifies the access privilege of the user, including preventing the user from performing the operations using the computer resources starting at the second time.

19 Claims, 4 Drawing Sheets

(56) References Cited

U.S. PATENT DOCUMENTS

2017/0163650 A1* 6/2017 Seigel ................... H04L 63/102
2019/0182260 A1* 6/2019 Patel ..................... H04L 63/107
2020/0106780 A1* 4/2020 Malliah ................. G06F 16/437
2021/0136077 A1* 5/2021 Kemme ................ H04L 63/108
2022/0245275 A1* 8/2022 Ryan ................... H04L 63/0407

OTHER PUBLICATIONS

Unifiedcompliance.com[online], "Revoke asset access when an individual is terminated," Unified Compliance Framework, available on or before 2020, retrieved Oct. 26, 2020, retrieved from URL <https://www.unifiedcompliance.com/products/search-controls/control/00516/>, 10 pages.

* cited by examiner

SYSTEMS AND METHODS FOR CONTROLLING USER ACCESS TO COMPUTER RESOURCES OF AN ORGANIZATION BY SEPARATED EMPLOYEES

TECHNICAL FIELD

The disclosure relates to systems and methods for controlling user access to computer resources of an organization.

BACKGROUND

An organization can maintain computer resources for use by one or more users, such as the employees of the organization. As an example, an organization can maintain computer systems, mobile devices, printers, telephones, networks, and other devices and systems, and allow its employees to use those devices and systems during their course of employment.

SUMMARY

In general, a computer security system can control user access to computer resources of an organization, and dynamically modify the access privileges of users based on changes to the users' employment statuses.

As an example, a computer security system can permit a user to perform certain operations during the normal course of the user's employment. However, upon receiving information indicating an anticipated change in the user's employment status, the computer system can selectively restrict the access privileges of the user to reduce a security risk associated with the user. For instance, prior to the anticipated change in the user's employment status, the computer security system can allow the user to perform certain low risk operations using the computer resources, while preventing the user from performing other high risk operations using the computer resources. Further, upon the user's change in employment status becoming effective, computer security system can further restrict the user's access privileges.

The implementations described in this disclosure can provide various technical benefits. For instance, a user who anticipates leaving an organization may engage in higher risk activities (for example, compared to users who anticipate remaining at the organization). As an example, the user may become less diligent in maintaining safe practices when accessing computer resources, and may inadvertently cause sensitive data to be distributed outside of the organization and/or allow malicious entities to gain authorized access to the computer resources. As another example, the user may attempt to do harm to the computer resources, such as disabling or otherwise damaging the computer resources. Further, the organization may expend a significant amount of computer resources to reverse or lessen the effects of the user's activities. The computer security systems described herein can reduce the likelihood that a user engages in these high risk activities, and can enable the computer systems to operate in a more secure and more resource efficient manner.

In an aspect, a method includes obtaining, by a computer security system, a data record indicating an anticipated change in an employment status of a user at an organization, where the data record includes a data field indicating an effective time of the anticipated change; at a first time prior to the effective time, modifying, by the computer security system, an access privilege of the user with respect to one or more computer resources of the organization, where modifying the access privilege of the user includes: allowing the user to perform one or more first operations using the one or more computer resources between the first time and a second time subsequent to the first time, and preventing the user from performing one or more second operations using the one or more computer resources starting at the first time; and at the second time, further modifying, by the computer security system, the access privilege of the user, where further modifying the access privilege of the user includes preventing the user from performing the one more first operations using the one or more computer resources starting at the second time.

Implementations of this aspect can include one or more of the following features.

In some implementations, the one or more computer resources can include at least one of: a computer system, a computer network, a telephone, a mobile device, a printer, or a removable data storage device.

In some implementations, the one or more first operations can include at least one of: accessing first data using the one or more computer resources, or distributing the first data using the one or more computer resources. The first data can be associated with a first security metric. Further, the one or more second operations can include at least one of: accessing second data using the one or more computer resources, or distributing the second data using the one or more computer resources. The second data can be associated with a second security metric greater than the first security metric.

In some implementations, the method can further include: retrieving the first data; identifying one or more first keywords contained in the first data; and determining, based on the one or more first keywords, that the first data is associated with the first security metric.

In some implementations, determining that the first data is associated with the first security metric can include determining that the one or more first keywords are not included in a database of keywords.

In some implementations, the method can further include: retrieving the second data; identifying one or more second keywords contained in the second data; and determining, based on the one or more second keywords, that the second data is associated with the second security metric.

In some implementations, determining that the second data is associated with the second security metric can include determining that at least some of the one or more second keywords are included in the database of keywords.

In some implementations, the method can further include: determining a first taxonomy of the first data, and determining, based on the first taxonomy, that the first data is associated with the first security metric.

In some implementations, the method can further include: determining a second taxonomy of the first data, and determining, based on the second taxonomy, that the second data is associated with the second security metric.

In some implementations, distributing the second data can include at least one of: sending an e-mail including the second data, printing the second data using one or more printers, copying the second data to a removable data storage device, or transmitting the data to a computer system that is not administered by the organization.

In some implementations, the one or more second operations can include at least one of: receiving an e-mail having an attachment on an e-mail, or receiving an e-mail having a selectable hyperlink.

In some implementations, preventing the user from performing the one or more second operations can include: receiving a first e-mail addressed to the user; removing one or more attachments and/or one or more selectable hyperlinks from the first e-mail; and subsequent to removing the one or more attachments and/or the one or more selectable hyperlinks from the first e-mail, transmitting the first e-mail to the user.

In some implementations, allowing the user to perform the one or more first operations can include: receiving a second e-mail addressed to the user; determining that the second e-mail does not include attachments or selectable hyperlinks; and subsequent to determining that the second e-mail does not include attachments or selectable hyperlinks, transmitting the second e-mail to the user without alternation.

In some implementations, preventing the user from performing the one or more second operations can include revoking an administrative privilege from a user account of the user.

In some implementations, the anticipated change in the employment status of the user can include at least one of: a termination of employment of the user by the organization, or a change in duties of the user with respect to the organization.

In some implementations, the second time can be the effective time.

In some implementations, the second time can be prior to the effective time.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

In general, a computer security system can control user access to computer resources of an organization, and dynamically modify the access privileges of users based on changes to the users' employment statuses.

As an example, a computer security system can permit a user to perform certain operations during the normal course of the user's employment. However, upon receiving information indicating an anticipated change in the user's employment status (for example, a termination, resignation, or other separation of the user from the organization), the computer system can selectively restrict the access privileges of the user prior of the effective date of the change, in order to reduce a security risk associated with the user.

For instance, prior to the anticipated change in the user's employment status, the computer security system can allow the user to perform certain low risk operations using the computer resources. For example, the computer system can allow the user to maintain general access to one or more computer systems, mobile devices, telephones, printers, networks, or other systems and devices, such that the user can carry out his remaining duties.

However, the computer security system can also prevent the user from performing other high risk operations using the computer resources. For example, prior to the anticipated change in the user's employment status, the computer system can prevent the user from accessing or distributing sensitive data, interacting with incoming e-mails in an unsafe manner, or performing operations using an elevated privilege level (for example, an administrative privilege level).

Further, upon the user's change in employment status becoming effective, computer security system can further restrict the user's access privileges. For example, the computer system can revoke the user's access privileges to the computer systems entirely, such that the user can no longer use the computer resources.

Accordingly, the computer system can selectively control user access to computer resources, such that the likelihood that a user engages in high risk activities is reduced. Thus, the computer resources of the organization can be operated in a more secure and more resource efficient manner.

Figure 1:
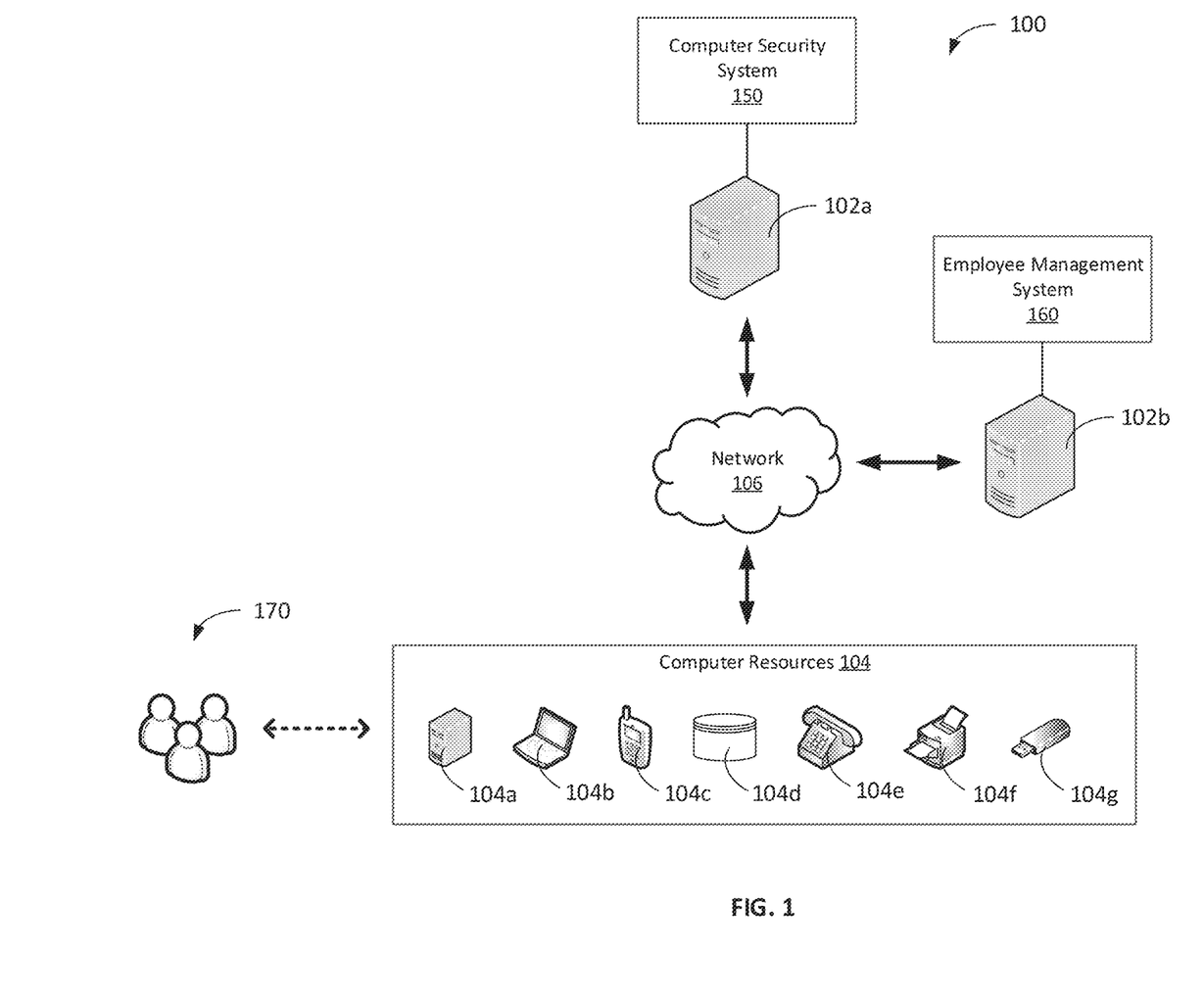
FIG. 1 is a diagram of an example system of interconnected electronic devices.

FIG. 1 shows an example system 100 of interconnected electronic devices. The system 100 includes computer systems 102a and 102b, and a set of computer resources 104 interconnected to one another by a network 106. A computer security system 152 is maintained on at least one of the computer systems (for example, the computer system 102a). Further, an employee management system 160 is maintained on at least one of the computer systems (for example, the computer system 102b).

In some implementations, at least a portion of the system 100 can be maintained and/or operated by a common organization (or group of organizations). Example organizations include companies, corporations, institutions, associations, groups, and clubs. In general, an organization can include several individuals (for example, employees, associates, or members) that work together for a particular purpose.

For instance, an organization can maintain and/or operate the system 100, and provide a group of users 170 access to the system 100 to perform activities in support of the organization. As an example, the organization can be a company or corporation, and the users 170 can be employees and/or associates of the company or corporation. Further, the users 170 can access the system 100 (for example, the computer resources 104, the network 106, etc.) to perform activities in service of the company or corporation.

The computer security system 150 can control access by the users 170 to the system 100. For instance, the computer security system 150 can generate a user account for each of the users 170, and grant access privileges to each of the users 170 via the user accounts. As an example, for each of the users 170, the computer security system 150 can permit that user to access certain ones of the computer resources 104, while also preventing that user from accessing certain other ones of the computer resources 104. As another example, for each of the users 170, the computer security system 150 can permit that user to perform certain operations using the computer resources 104, while also preventing that user from performing certain other operations using the computer resources 104.

Further, the computer security system 150 can dynamically modify the access privileges of the users 170 over time. For instance, upon receiving an indication of a change (or anticipated change) in the employment status of a user 170, the computer security system 150 can dynamically modify the access privileges of that user to account for the change (or anticipated change).

As an example, the employee management system 150 can maintain data records regarding an employment status of each of the users 170 with respect to the organization. For instance, each data record can indicate a title or position a respective user 170 in an organization, and a set of duties or responsibilities of that user 170 to the organization. Further, at least some of the data records can indicate an anticipated change in the employment status of a respective user 170. For example, a data record may indicate an anticipated termination of the employment of a particular employee by the organization, and an effective time (for example, a time of day and/or a date) of the termination. As another example, a data record may indicate an anticipated resignation of employment of a particular employee by the organization, and an effective time of the resignation. As another example, a data record may indicate an anticipated transfer or change in responsibility of a particular employee with respect to the organization, and an effective time of the transfer or change.

The employee management system 160 can provide at least a portion of the data records to the computer security system 150. For example, upon receiving data indicating an anticipated modification to the employment status of a particular user 170, the employee management system 160 can update the data record for that user 170, and transmit the updated data record to the computer security system 150.

In response to receiving this information from the employee management system 160, the computer security system 150 can dynamically modify the access privileges of that user 170 in accordance with the anticipated change in the user's employment status. For example, the computer security system 150 can permit the user 170 to continue accessing certain computer resources 104 and/or performing certain operations using the computer resources 104. However, the computer security system 150 can selectively restrict the user 170 from accessing certain other computer resources 104 and/or performing certain other operations using the computer resources 104. Further, the computer security system 150 can perform these modifications prior to the effective date of the user's anticipated change in employment, such that the security risk associated with the user is reduced during the time leading up to the effective date. Example sets of access privileges and operations are described in further detail below.

Each of the computer systems 102a and 102b can include any number of electronic device that are configured to receive, process, and transmit data. Examples of the computer systems 102a and 102b include client computing devices (such as desktop computers or notebook computers), server computing devices (such as server computers or cloud computing systems), mobile computing devices (such as cellular phones, smartphones, tablets, personal data assistants, notebook computers with networking capability), wearable computing devices (such as a smart phone or a headset), and other computing devices capable of receiving, processing, and transmitting data. In some implementations, the computer systems 102a and 102b can include computing devices that operate using one or more operating systems (as examples, Microsoft Windows, Apple macOS, Linux, Unix, Google Android, and Apple iOS, among others) and one or more architectures (as examples, x86, PowerPC, and ARM, among others). In some implementations, one or more of the computer system 102a and 102b need not be located locally with respect to the rest of the system 100, and one or more of the computer systems 102a and 102b can be located in one or more remote physical locations.

Each the computer systems 102a and 102b can include a respective user interface that enables users interact with the computer systems 102a and 102b, the computer security system 150, and/or the employee management system 150. For example, a user interface can enable a user to view data from one or more of the computer systems 102a and 102b, the computer security system 150, and/or the employee management system 150. As another example, a user interface can enable a user to transmit data from one computer system 102a or 102b to another. As another example, a user interface can enable a user to issue commands to one or more of the computer systems 102a and 102b, the computer security system 150, and/or the employee management system 150. Commands can include, for example, any user instruction to one or more of the computer systems 102a and 102b, the computer security system 150, and/or the employee management system 150 to perform particular operations or tasks. In some implementations, a user can install a software application onto one or more of the computer systems 102a and 102b to facilitate performance of these tasks.

In FIG. 1, the computer systems 102a and 102b are illustrated as respective single components. However, in practice, the computer systems 102a and 102b can be implemented on one or more computing devices (for example, each computing device including at least one processor such as a microprocessor or microcontroller). As an example, the computer system 102a can be a single computing device that is connected to the network 106, and the computer security system 150 be maintained and operated on the single computing device. As another example, the computer system 102a can include multiple computing devices that are connected to the network 106, and the computer system 150 can be maintained and operated on some or all of the computing devices. For instance, the computer system 102a can include several computing devices, and the computer system 150 can be distributed on one or more of these computing devices.

The computer resources 104 include any electrode device or system that can be accessed and used by the users 170. As an example, the computer resources 104 can include one or more server computer systems 104a, client computer systems 104b, and/or mobile devices 104c (for instance, electronic devices similar to those described above with reference to the computer systems 102a and 102b). As another example, the computer resources 104 can include one or more databases or data stores 104d. As another example, the computer resources 104 can include one or more telecommunications devices 104e, such as telephones, video conferencing devices, fax machines, pagers, or other telecommunications devices. As another example, the computer resources 104 can include one or more printers 104f, such as laser printers, ink jet printers, or thermal printers. As another example, the computer resources 104 can include one or more removable data storage devices, such as flash drives, storage cards, storage disks, or other devices having computer memory for storing data.

In some implementations, at least some of the computer resources 104 can be communicatively coupled to the network 106, such that they can communicate with one another, the computer systems 102a and 102b, the computer security system 150, and/or the employee management system 160.

Further, although FIG. 1 shows the computer resources 104 as separate from the computer systems 102a and 102b and the network 106, in practice, the computer resources 104 can also include the computer systems 102a and 102b and the network 106, or a portion thereof.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

Figure 2:
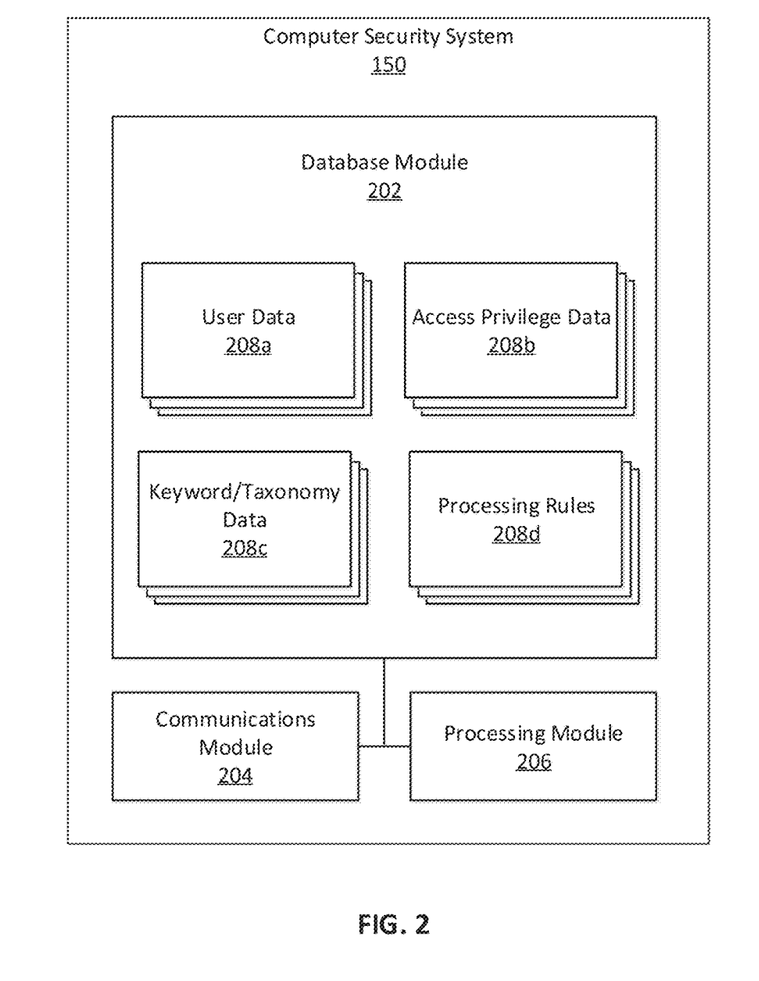
FIG. 2 is a diagram of an example computer security system.

FIG. 2 shows various aspects of the computer security system 150. The computer security system 150 includes several modules that perform particular functions related to the operation of the system 100. For example, the computer security 150 can include a database module 202, a communications module 204, and a processing module 206.

The database module 202 maintains information related to controlling user access to the system 100.

As an example, the database module 202 can store user data 208a regarding each of the users of the system 100. For instance, the user data 208a can include information regarding the current employment status of each user in an organization, such as a title or position of the user, and a set of duties or responsibilities of that user to the organization. Further, the user data 208a can include information regarding an anticipated change in an employment status of one or more of the users. For example, the user data 208a can include information regarding an anticipated termination of the employment of a particular user by the organization, and an effective of the termination. As another example, a user data 208a can include information regarding indicate an anticipated resignation of employment of a particular user by the organization, and an effective time of the resignation. As another example, a user data 208a can include information regarding an anticipated transfer or change in responsibility of a particular user with respect to the organization, and an effective time of the transfer or change. In some implementations, at least some of the user data 208a can be received from the employee management system 160. In some implementations, at least some of the user data 208a can be received from other sources and/or manually input by a user (for example, an administrator).

As another example, the database module 202 can store access privilege data 208b regarding each of the users. In general, the access privileged data 208b includes information indicating what each user can and cannot do with respect to the system 100. For example, the access privilege data 208b can indicate, for each user, the systems or devices of the system 100 that user is permitted to access or use. As another example, the access privilege data 208b can indicate, for each user, the systems or devices of the system 100 that each user is prohibited from accessing or using. As another example, the access privilege data 208b can indicate, for each user, the operations that each user is permitted to perform using the system 100. As another example, the access privilege data 208b can indicate, for each user, the operations that each user is prohibited from permitting using the system 100.

In some implementation, the access privilege data 208b can include information regarding a user account that has been assigned to each user, and a set of access privileges that have been assigned to user account. As an example, the access privilege data 208b can include user accounts managed by Microsoft Group Policy, and can control each user's interactions with the systems or devices of the system 100 in a Microsoft Active Directory environment.

As another example, the database module 202 can store keyword/taxonomy data 208c regarding data stored by the system 100. For instance, the keyword/taxonomy data 208c can include one or more databases of keywords that are indicative of sensitive information. Sensitive information can include, for example, information that is confidential or privileged, or information that is not intended to be publicly distributed outside of the organization. Example sensitive information includes information regarding the employees of an organization, trade secrets of the organization, internal communications within the organization, or other information not intended for distribution outside of the organization. The computer security system 150 can determine whether information is potentially sensitive, at least in part, by identifying one or more keywords in the data, and determining whether those keywords are included in the database of keywords. If so, the computer security system 150 determines that that data is more likely to be sensitive in nature. If not, the computer security system 150 determines that that data is less likely to be sensitive in nature.

As another example, the keyword/taxonomy data 208c can include one or more databases of taxonomies that are indicative of sensitive information. Taxonomies can refer to the type of classification of data. As an example, a taxonomy can refer to the file type of the data, the encoding of the data (for example, plain text, binary, hexadecimal, etc.), the data size of the data, the file name of the data, or any other characteristic of the data. The computer security system 150 can determine whether information is potentially sensitive, at least in part, by identifying one or more taxonomies of the data, and determining whether those taxonomies are included in the database of taxonomies. If so, the computer security system 150 determines that that data is more likely to be sensitive in nature. If not, the computer security system 150 determines that that data is less likely to be sensitive in nature.

In some implementations, for each instance of data, the computer security system 150 can determine a security metric representing the sensitivity of that data. As an example, data having a high security metric may be considered relatively sensitive compared to data having a comparatively lower security metric.

In some implementations, the security metric can be determined based on whether the data has keywords and/or taxonomies that are indicated in the keyword/taxonomy data 208c as being indicative of sensitive information. As an example, if an instance of data includes one or more keywords from the database of keywords, the computer security system 150 can increase the security metric for that data. As another example, if an instance of data includes one or more taxonomies from the database of taxonomies, the computer security system 150 can increase the security metric for that data.

Further, in some implementations, each keyword and/or taxonomy can be associated with a different weight. For example, keywords that are very likely to be indicative of sensitive data can be assigned a large weight, such that their presence in data increases the data's security metric by a large amount, whereas keywords that are less likely to be indicative of sensitive data can be assigned a smaller weight, such that their presence in data increases the data's security metric by a smaller amount. As another example, taxonomies that are very likely to be indicative of sensitive data can be assigned a large weight, such that data having that taxonomy increases the data's security metric by a large amount, whereas taxonomies that are less likely to be indicative of sensitive data can be assigned a smaller weight, such that data having that taxonomy increases the data's security metric by a smaller amount.

In some implementations, data having a security metric that exceeds a particular threshold value can be considered sensitive, whereas data having a security metric that does not exceed the threshold value can be considered not sensitive. In some implementations, the threshold value can be a tunable value (for example, specified by an administrator of the system 100).

In some implementations, the keyword/taxonomy data 208c can be continuously or periodically updated. For example, the database of keywords and the database of taxonomies can be updated to include new keywords and/or taxonomies (for example, to enhance the ability of the computer security system 150 to identify potentially sensitive data). As another example, the database of keywords and the database of taxonomies can be updated to remove keywords and/or taxonomies (for example, to reduce the likelihood of false positives by the computer security system 150 in identifying potentially sensitive data). As another example, the weights that are associated with each keyword and/or taxonomy can be updated to improve the accuracy by which sensitive data is detected by the computer security system 150.

As another example, the database module 202 can include processing rules 208d for controlling the operation of the computer security system 150. For instance, as described above, the computer security system 150 can control user access to the system 100, and dynamically modify the access privileges of users based on changes to the users' employment statuses. To facilitate this functionality, the processing rules 208d can specify particular sets of operations that can and cannot be performed by users based on their employment statuses and any changes (or anticipated changes) thereof.

For instance, the processing rules 208d can specify that, upon determining an anticipated change to a user's employment status, the computer security system 150 is to allow the user to perform certain low risk operations using the system 100, but to restrict the user from performing certain high risk operations using the system 100 prior to the effective date of the anticipated change.

As an example, the processing rules 208d can specify that, prior to the effective date of the anticipated change, the computer security system 150 is to provide the user with general access privileges to a subset of the computer resources 104 (for example, the computer resources 104 that have been previously assigned to that user for use). General access privileges can include, for example, the ability for the user to log into certain designated devices or systems, execute certain applications on those devices or systems, access non-sensitive information using his devices or systems, and transmit and/or receive non-sensitive information using his devices or systems (for example, via e-mail, chat messages, text messages, etc.). This can be beneficial, for example, in enabling the user to carry out any remaining duties prior to his departure from the organization.

Further, the processing rules 208d can also specify that, prior to the effective date of the anticipated change, the computer security system 150 is to prevent the user from performing certain high risk operations using the system 100. This can be beneficial, for example, in reducing the security risk associated with the user is during the time leading up to his departure from the organization.

For example, the processing rules 208d can specify that, prior to the effective date of the anticipated change, the computer security system 150 is to prevent the user from logging into certain designated devices or system of the system 100 (for example, devices or systems that store or process sensitive information).

As another example, the processing rules 208d can specify that, prior to the effective date of the anticipated change, the computer security system 150 is to prevent the user from accessing sensitive information (for example, using the computer resources 104). For instance, the computer security system 150 can prevent the user from retrieving sensitive information from certain computer systems, database or data stores, or networks.

As another example, the processing rules 208d can specify that, prior to the effective date of the anticipated change, the computer security system 150 is to prevent the user from distributing sensitive information (for example, using the computer resources 104). For instance, the computer security system 150 can prevent the user from sending e-mails, chat messages, and/or text messages including sensitive information. Further, the computer security system 150 can prevent the user from uploaded sensitive information to third-party systems (for example, third party data upload or storage services). Further, the computer security system 150 can prevent the user from printing sensitive information using a printer. Further, the computer security system 150 can prevent the user from faxing sensitive information using a fax machine. Further, the computer security system 150 can prevent the user from copying sensitive information onto a removable data storage device.

As described above, the computer security system 150 can determine whether a particular instance of data is sensitive or non-sensitive based on a security metric associated with that data. Further, as described above, the security metric can be determined based, at least in part, on one or more keywords included in the data and/or a taxonomy of the data.

As another example, the processing rules 208d can specify that, prior to the effective date of the anticipated change, the computer security system 150 is to revoke any elevated access privileges associated with the user's account. For example, if the user's account is an administrative account, root account, or "super user" account having elevated access privileges, the computer security system 150 can downgrade the user's account to a restricted account or general user account having lower access privileges.

As another example, the processing rules 208d can specify that, prior to the effective date of the anticipated change, the computer security system 150 is to selectively filter or modify incoming communications to the user. For example, the processing rules 208d can specify that, prior to the effective date of the anticipated change, the computer security system 150 is to monitor each of the incoming communications to the user (for example, incoming e-mail messages addressed to the user), remove any attachments or selectable hyperlinks from those communications. This can be beneficial, for example, as user may become less diligent in maintaining safe practices prior to his departure, and may be more prone to opening malicious attachments and/or selecting malicious hyperlinks in his communications.

In some implementations, the computer security system 150 can detect attachments and selectable hyperlinks (for example, clickable uniform resource locators (URLs)) in an incoming communication, remove the attachments and selectable hyperlinks from the communication, and forward the communication (without the attachments and selectable hyperlinks) to the user. In some implementations, the computer security system 150 can detect attachments and selectable hyperlinks in an incoming communication, and prevent the user from access the communication entirely.

In some implementations, the computer security system 150 can remove a selectable hyperlinks by replacing the hyperlink with non-selectable text. For example, an incoming communication can include a selectable hyperlink "Click Me" that, when selected by a user, directs the user's device to a web address "http://www.malware.com." The computer security system 150 can replace the hyperlink with non-selectable text (for example, "Blocked"), and provide the communication to the user.

In some implementations, the computer security system 150 can remove a selectable hyperlink from a communication without replacing the hyperlinks.

Further, the processing rules 208d can specify that, upon the effective date of the anticipated change, the computer security system 150 can further modify the user's access privileges. For example, the processing rules 208d can specify that the computer security system 150 revoke the user's access privileges to the system 100 entirely, such that the user can no longer use the system 100.

As described above, the computer security system 150 also includes a communications module 204. The communications module 204 allows for the transmission of data to and from the computer security system 150. For example, the communications module 204 can be communicatively connected to the network 106, such that it can transmit data to and receive data from each of the computer systems 102a and 102b and the computer resources 104. Information received from the computer systems 102a and 102b and the computer resources 104 can be processed (for example, using the processing module 206) and stored (for example, using the database module 202).

Further, the communications module 204 can generate command signals to control one or more components of the system 100 (for instance, in accordance with the process rules 208d). As an example, the communications module 204 can generate one or more command signals to enable one or more users 170 to access or use certain computer resources 104 and/or to perform certain operations using the computer resources 104. As another example, the communications module 204 can generate one or more command signals to prevent one or more users 170 from accessing or using certain other computer resources 104 and/or performing certain other operations using the computer resources 104.

As described above, the computer security system 150 also includes a processing module 206. The processing module 206 processes data stored or otherwise accessible to the computer security system 150. For example, the processing module 206 can retrieve the user data 208a, and updated the access privilege data 208b for one or more of the users in accordance with the processing rules 208d. As another example, the processing module 206 can retrieve instances of data, and determine whether the data is sensitive or non-sensitive based on the keyword/taxonomy data 208c. As another example, the processing module 206 can generate command signals to control one or more components of the system 100 in accordance with the processing rules 208d, and transmit those command signals using the communications module 204.

Although the examples described above pertain to controlling access to a company's systems by its employees, these are merely illustrative examples. In practice, the implementations described herein can be used to control access to any organization's (or a group of organizations') systems by any individuals or entities associated with that organization (or that group of organizations).

Example Processes

Figure 3:
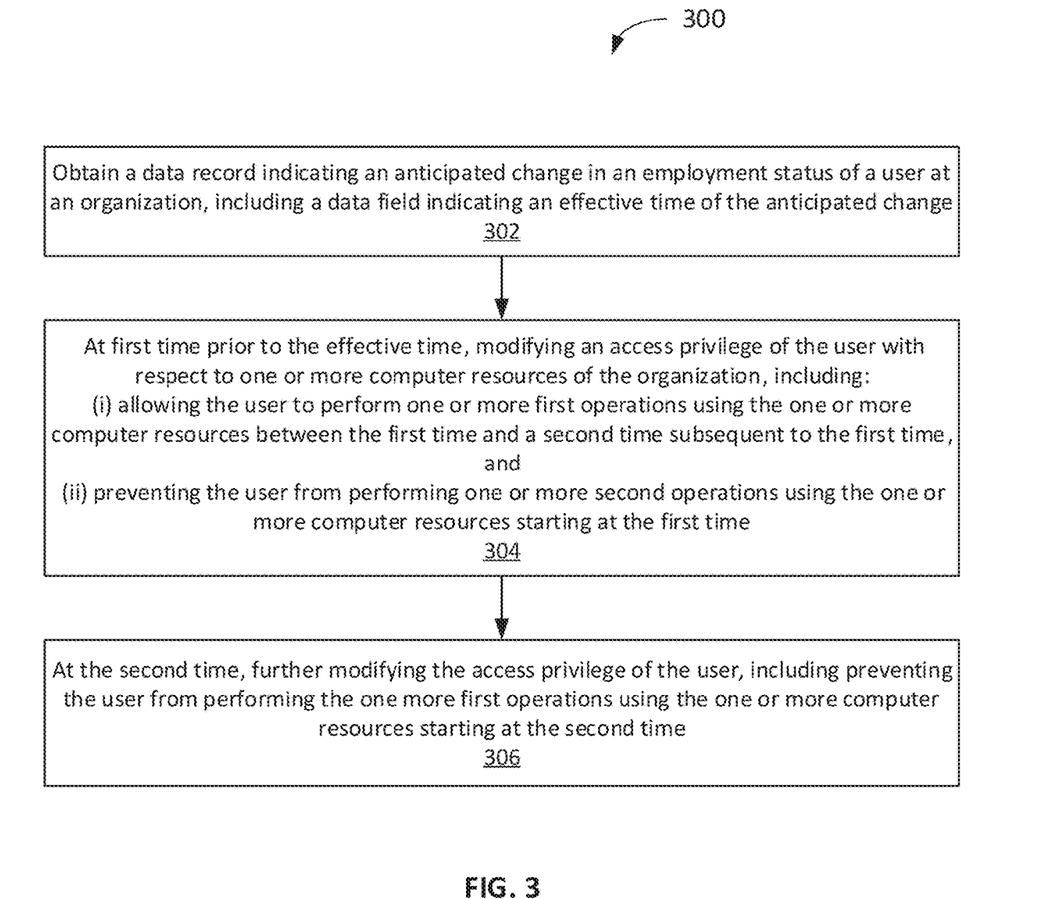
FIG. 3 is a flow chart diagram of an example process for controlling user access to one or more computer resources of an organization.

FIG. 3 shows an example process 300 for controlling user access to one or more computer resources of an organization. In some implementations, the process 300 can be performed by the system 100 described in this disclosure (for example, the system 100 including the computer security system 150 shown and described with reference to FIGS. 1 and 2) using one or more processors (for example, using the processor or processors 410 shown in FIG. 4).

In the process 300, a system obtains a data record indicating an anticipated change in an employment status of a user at an organization (block 302). The data record includes a data field indicating an effective time of the anticipated change.

In some implementations, the anticipated change in the employment status of the user can include a termination of employment of the user by the organization and/or a change in duties of the user with respect to the organization.

Further, at a first time prior to the effective time, the system modifies an access privilege of the user with respect to one or more computer resources of the organization (block 304). As an example, the system allows the user to perform one or more first operations using the one or more computer resources between the first time and a second time subsequent to the first time. Further, the system prevents the user from performing one or more second operations using the one or more computer resources starting at the first time.

In some implementations, the one or more computer resources can include any number of computer systems, computer networks, telephones, mobile devices, printers, and/or removable data storage devices. Example computer resources are described, for instance, with reference to FIG. 1.

At the second time, the system further modifies the access privilege of the user (block 306). As an example, the system prevents the user from performing the one more first operations using the one or more computer resources starting at the second time.

In some implementations, the second time can be the same as the effective time. In some implementations, the second time can be prior to the effective time.

In some implementations, the one or more first operations can include accessing first data using the one or more computer resources, and/or distributing the first data using the one or more computer resources, where the first data is associated with a first security metric. Further, the one or more second operations can include accessing second data using the one or more computer resources, and/or distributing the second data using the one or more computer resources, where the second data is associated with a second security metric greater than the first security metric. Accordingly, the system can selectively allow the user to access and/or distribute certain types of data (for example, data this is not sensitive), while selectively preventing the user from accessing or distributing certain other types of data (for example, data that is sensitive).

In some implementations, the system can determine a security metric for data based on keywords contained in the data.

As an example, the system can retrieve the first data, identify one or more first keywords contained in the first data, and determine that the first data is associated with the first security metric based on the one or more first keywords. As another example, the system can retrieve the second data, identifying one or more second keywords contained in the second data, and determine that the second data is associated with the second security metric based on the one or more second keywords.

In some implementations, the system can maintain a database of keywords (for example, a list of keywords indicative of potentially sensitive information), and determine a security metric for data based on whether keywords from the data are included in the database. As an example, if the data does not include any keywords are not included in the database of keywords, the system can assign the data a security metric representing a low security risk. As another example, if the data includes keywords that are also included in the database of keywords, the system can assign the data a security metric representing an elevated security risk.

In some implementations, the system can determine a security metric for data based on a taxonomy of the data (for example, a classification or type of the data).

As an example, the system can retrieve the first data, identify a first taxonomy of the first data, and determine that the first data is associated with the first security metric based on the first taxonomy. As another example, the system can retrieve the second data, identify a second taxonomy of the second data, and determine that the second data is associated with the second security metric based on the second taxonomy.

In some implementations, starting at the first time, the system can selectively prevent the user from distributing the second data. For example, the system can prevent the user from sending an e-mail including the second data, printing the second data using one or more printers, copying the second data to a removable data storage device, and/or transmitting the data to a computer system that is not administered by the organization.

In some implementations, starting at the first time, the system can selectively prevent the user from receiving an e-mail having an attachment on an e-mail and/or receiving an e-mail having a selectable hyperlink.

As an example, starting at the first time, the system can receive a first e-mail addressed to the user, and remove one or more attachments and/or one or more selectable hyperlinks from the first e-mail. Subsequently, the system can transmit the first e-mail (without any attachments or selectable hyperlinks) to the user.

As another example, starting at the first time, the system can receive a second e-mail addressed to the user, and determine that the second e-mail does not include attachments or selectable hyperlinks. Subsequently, the system can transmit the second e-mail to the user without alternation.

In some implementations, starting at the first time, the system can revoke an administrative privilege from a user account of the user. For example, the system can downgrade the user's account from (i) an administrative account, root account, or "super user" account having elevated access privileges to (ii) a restricted account or general user account having lower access privileges.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and the computer security system 150 can be implemented using digital electronic circuitry, or in computer software, firmware, or hardware, or in combinations of one or more of them. In another example, the process 300 shown in FIG. 3 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 4:
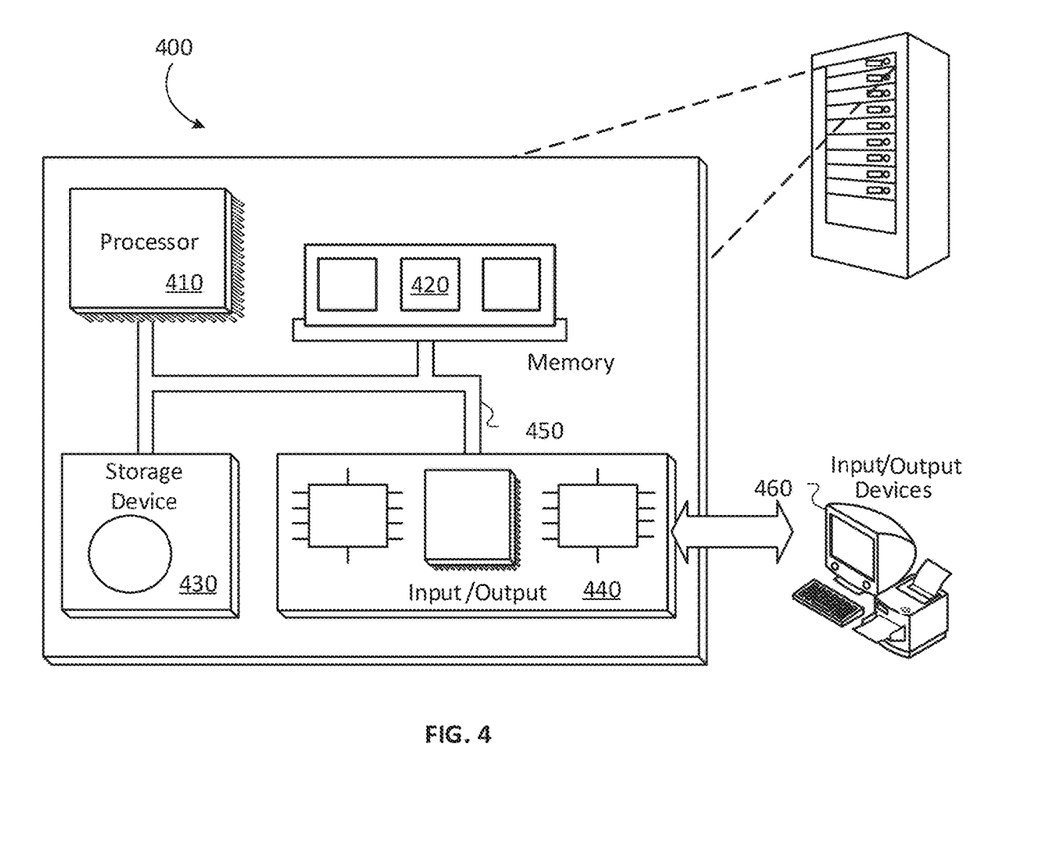
FIG. 4 is a schematic diagram of an example computer system.

FIG. 4 shows an example computer system 400 that includes a processor 410, a memory 420, a storage device 430 and an input/output device 440. Each of the components 410, 420, 430 and 440 can be interconnected, for example, by a system bus 450. The processor 410 is capable of processing instructions for execution within the system 400. In some implementations, the processor 410 is a single-threaded processor, a multi-threaded processor, or another type of processor. The processor 410 is capable of processing instructions stored in the memory 420 or on the storage device 430. The memory 420 and the storage device 430 can store information within the system 400.

The input/output device 440 provides input/output operations for the system 400. In some implementations, the input/output device 440 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 460. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:
1. A method comprising:
obtaining, by a computer security system, a data record indicating an anticipated change in an employment status of a user at an organization, wherein the data record comprises a data field indicating an effective time of the anticipated change;
identifying, by the computer security system, one or more first keywords contained in a first data that is associated with one or more first operations;
determining, by the computer security system, that the one or more identified first keywords are not included in a database of keywords;
identifying, by the computer security system, one or more second keywords contained in a second data that is associated with one or more second operations;
determining, by the computer security system, that the one or more identified second keywords are included in the database of keywords, wherein the database of keywords includes keywords that are indicative of sensitive information of the organization;
at a first time prior to the effective time, modifying, by the computer security system, an access privilege of the user with respect to one or more computer resources of the organization, wherein modifying the access privilege of the user comprises:
allowing the user to perform the one or more first operations using the one or more computer resources between the first time and a second time subsequent to the first time, and preventing the user from performing the one or more second operations using the one or more computer resources starting at the first time; and
at the second time, further modifying, by the computer security system, the access privilege of the user, wherein further modifying the access privilege of the user comprises preventing the user from performing the one or more first operations using the one or more computer resources starting at the second time.

2. The method of claim 1, wherein the one or more computer resources comprise at least one of:
a computer system,
a computer network,
a telephone,
a mobile device,
a printer, or
a removable data storage device.

3. The method of claim 1, wherein the one or more first operations comprise at least one of: accessing the first data using the one or more computer resources, or distributing the first data using the one or more computer resources, wherein the first data is associated with a first security metric, and wherein the one or more second operations comprise at least one of: accessing the second data using the one or more computer resources, or distributing the second data using the one or more computer resources, wherein the second data is associated with a second security metric greater than the first security metric.

4. The method of claim 3, further comprising: retrieving the first data; identifying the one or more first keywords contained in the first data; and determining, based on the one or more first keywords, that the first data is associated with the first security metric.

5. The method of claim 4, wherein determining that the first data is associated with the first security metric comprises:
determining that the one or more first keywords are not included in a database of keywords.

6. The method of claim 5, further comprising: retrieving the second data; identifying the one or more second keywords contained in the second data; and determining, based on the one or more second keywords, that the second data is associated with the second security metric.

7. The method of claim 6, wherein determining that the second data is associated with the second security metric comprises:
determining that at least some of the one or more second keywords are included in the database of keywords.

8. The method of claim 3, further comprising:
determining a first taxonomy of the first data, and
determining, based on the first taxonomy, that the first data is associated with the first security metric.

9. The method of claim 3, further comprising:
determining a second taxonomy of the first data, and
determining, based on the second taxonomy, that the second data is associated with the second security metric.

10. The method of claim 3, wherein distributing the second data comprises at least one of:
sending an e-mail including the second data,
printing the second data using one or more printers,
copying the second data to a removable data storage device, or
transmitting the data to a computer system that is not administered by the organization.

11. The method of claim 1, wherein the one or more second operations comprise at least one of:
receiving an e-mail having an attachment on an e-mail, or
receiving an e-mail having a selectable hyperlink.

12. The method of claim 1, wherein preventing the user from performing the one or more second operations comprise: receiving a first e-mail addressed to the user; removing one or more attachments and/or one or more selectable hyperlinks from the first e-mail; and subsequent to removing the one or more attachments and/or the one or more selectable hyperlinks from the first e-mail, transmitting the first e-mail to the user.

13. The method of claim 12, wherein allowing the user to perform the one or more first operations comprises:
receiving a second e-mail addressed to the user;
determining that the second e-mail does not include attachments or selectable hyperlinks; and
subsequent to determining that the second e-mail does not include attachments or selectable hyperlinks, transmitting the second e-mail to the user without alternation.

14. The method of claim 1, preventing the user from performing the one or more second operations comprise: revoking an administrative privilege from a user account of the user.

15. The method of claim 1, wherein the anticipated change in the employment status of the user comprises at least one of:
a termination of employment of the user by the organization, or
a change in duties of the user with respect to the organization.

16. The method of claim 1, wherein the second time is the effective time.

17. The method of claim 1, wherein the second time is prior to the effective time.

18. A system comprising:
one or more processors; and
one or more non-transitory computer readable media storing instructions that, when executed by the one or more processors, cause the one or more processors to perform operations comprising:
obtaining a data record indicating an anticipated change in an employment status of a user at an organization, wherein the data record comprises a data field indicating an effective time of the anticipated change;
identifying one or more first keywords contained in a first data that is associated with one or more first operations;
determining that the one or more identified first keywords are not included in a database of keywords;
identifying one or more second keywords contained in a second data that is associated with one or more second operations;
determining that the one or more identified second keywords are included in the database of keywords, wherein the database of keywords includes keywords that are indicative of sensitive information of the organization;
at a first time prior to the effective time, modifying an access privilege of the user with respect to one or more computer resources of the organization, wherein modifying the access privilege of the user comprises:
allowing the user to perform the one or more first operations using the one or more computer resources between the first time and a second time subsequent to the first time, and preventing the user from performing the one or more second operations using the one or more computer resources starting at the first time; and at the second time, further modifying the access privilege of the user, wherein further modifying the access privilege of the user comprises preventing the user from performing the one or more first operations using the one or more computer resources starting at the second time.

19. One or more non-transitory computer readable media storing instructions that, when executed by one or more processors, cause the one or more processors to perform operations comprising:

obtaining a data record indicating an anticipated change in an employment status of a user at an organization, wherein the data record comprises a data field indicating an effective time of the anticipated change;

identifying one or more first keywords contained in a first data that is associated with one or more first operations;

determining that the one or more identified first keywords are not included in a database of keywords;

identifying one or more second keywords contained in a second data that is associated with one or more second operations;

determining that the one or more identified second keywords are included in the database of keywords, wherein the database of keywords includes keywords that are indicative of sensitive information of the organization;

at a first time prior to the effective time, modifying an access privilege of the user with respect to one or more computer resources of the organization, wherein modifying the access privilege of the user comprises:

allowing the user to perform the one or more first operations using the one or more computer resources between the first time and a second time subsequent to the first time, and preventing the user from performing the one or more second operations using the one or more computer resources starting at the first time; and at the second time, further modifying the access privilege of the user, wherein further modifying the access privilege of the user comprises preventing the user from performing the one or more first operations using the one or more computer resources starting at the second time.

\* \* \* \* \*